US012607228B2

(12) United States Patent
Zhou et al.

(10) Patent No.: US 12,607,228 B2
(45) Date of Patent: *Apr. 21, 2026

(54) ROLLING BEARING AND METHOD OF MANUFACTURING SAME

(71) Applicant: AKTIEBOLAGET SKF, Gothenburg (SE)

(72) Inventors: Xiaobo Zhou, Houten (NL); Thijs Nijdam, Amersfoort (NL); Andreas Vierling, Schwebheim (DE); Frank Henninger, Grafenrheinfeld (DE); Bo Shen, Jiangyin (CN); Lijun Cao, Houten (NL); Victor Brizmer, Utrecht (NL); Yafen Chen, Shanghai (CN); Hongyuan An, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 34 days.

This patent is subject to a terminal disclaimer.

(21) Appl. No.: 18/766,964

(22) Filed: Jul. 9, 2024

(65) Prior Publication Data

US 2025/0035159 A1     Jan. 30, 2025

(30) Foreign Application Priority Data

Jul. 26, 2023    (DE) .......................... 102023207102.9

(51) Int. Cl.
| | |
|---|---|
| *F16C 19/06* | (2006.01) |
| *C09D 7/40* | (2018.01) |
| *C09D 7/65* | (2018.01) |
| *F16C 33/58* | (2006.01) |
| *F16C 33/62* | (2006.01) |
| *F16C 33/64* | (2006.01) |
| *F16C 33/66* | (2006.01) |

(Continued)

(52) U.S. Cl.
CPC ............ *F16C 33/6696* (2013.01); *C09D 7/65* (2018.01); *C09D 7/68* (2018.01); *C09D 7/69* (2018.01);

(Continued)

(58) Field of Classification Search
CPC .... F16C 19/06; F16C 33/1095; F16C 33/586; F16C 33/62; F16C 33/64; F16C 33/6696;

(Continued)

(56) References Cited

U.S. PATENT DOCUMENTS

| | | |
|---|---|---|
| 4,355,124 A | 10/1982 | Baumann et al. |
| 4,511,606 A | 4/1985 | Ehrlich et al. |

(Continued)

FOREIGN PATENT DOCUMENTS

| | | |
|---|---|---|
| DE | 202014010549 U1 | 1/2016 |
| EP | 2910805 B1 | 6/2017 |

(Continued)

OTHER PUBLICATIONS

Unpublished U.S. Appl. No. 18/766,993, first named inventor: Xiaobo Zhou, filing date: Jul. 9, 2024.

(Continued)

*Primary Examiner* — Phillip A Johnson
(74) *Attorney, Agent, or Firm* — J-TEK LAW PLLC; Scott T. Wakeman; Jeffrey D. Tekanic

(57) ABSTRACT

A rolling bearing includes an outer ring having an outer surface configured to be fitted into a first component, an inner ring having an inner surface configured to be fitted onto a second component, at least one rolling element arranged between the outer ring and the inner ring, and an antimony-free composite coating comprising a binder and a solid lubricant on the outer surface of the outer ring and/or the inner surface of the inner ring.

21 Claims, 2 Drawing Sheets

(51) Int. Cl.

| | |
|---|---|
| *F16C 35/073* | (2006.01) |
| *F16C 35/077* | (2006.01) |
| *C10N 40/02* | (2006.01) |
| *C10N 50/00* | (2006.01) |
| *C10N 80/00* | (2006.01) |

(52) U.S. Cl.
CPC ............ *F16C 19/06* (2013.01); *F16C 33/586* (2013.01); *F16C 33/62* (2013.01); *F16C 33/64* (2013.01); *F16C 35/073* (2013.01); *F16C 35/077* (2013.01); *C10M 2213/0623* (2013.01); *C10N 2040/02* (2013.01); *C10N 2050/14* (2020.05); *C10N 2080/00* (2013.01); *F16C 2202/02* (2013.01); *F16C 2202/10* (2013.01); *F16C 2202/30* (2013.01); *F16C 2202/50* (2013.01); *F16C 2208/32* (2013.01); *F16C 2223/30* (2013.01); *F16C 2240/60* (2013.01)

(58) Field of Classification Search
CPC .. F16C 35/073; F16C 35/077; F16C 2208/32; F16C 2223/30; F16C 2223/40; F16C 2223/42; F16C 2240/54; F16C 2240/60; C09D 7/65; C09D 7/68; C09D 7/69; C10M 2213/0623; C10N 2040/02; C10N 2050/14; C10N 2080/00
See application file for complete search history.

(56) References Cited

U.S. PATENT DOCUMENTS

| | | | |
|---|---|---|---|
| 6,726,994 | B1 | 4/2004 | Araki et al. |
| 9,958,008 | B2 | 5/2018 | Vieira De Morais et al. |
| 10,563,697 | B2 | 2/2020 | Motoda et al. |
| 10,865,832 | B2 | 12/2020 | Motoda et al. |
| 2014/0301880 | A1 | 10/2014 | Horibe et al. |
| 2016/0290397 | A1 | 10/2016 | Vieira De Morais et al. |
| 2019/0003529 | A1 | 1/2019 | Motoda et al. |
| 2022/0341464 | A1 | 10/2022 | Fukuzawa et al. |
| 2023/0272820 | A1 | 8/2023 | Kawaguchi et al. |
| 2024/0052887 | A1* | 2/2024 | Takizawa .............. F16C 33/586 |

FOREIGN PATENT DOCUMENTS

| | | | |
|---|---|---|---|
| EP | 3957546 | A1 | 2/2022 |
| JP | H11246823 | A | 9/1999 |
| JP | 2007002912 | A | 1/2007 |
| JP | 2009234481 | A | 10/2009 |
| JP | 2011112191 | A | 6/2011 |
| JP | 2014228099 | A | 12/2014 |
| WO | 8303612 | A1 | 10/1983 |

OTHER PUBLICATIONS

Unpublished U.S. Appl. No. 18/767,017, first named inventor: Xiaobo Zhou, filing date: Jul. 9, 2024.
Unpublished U.S. Appl. No. 18/767,050, first named inventor: Xiaobo Zhou, filing date: Jul. 9, 2024.
Office Action from the United States Patent Office mailed Nov. 21, 2025, in related U.S. Appl. No. 18/766,993 and examined claims 1-17.
Office Action from the United States Patent Office mailed Oct. 14, 2025, in related U.S. Appl. No. 18/767,017 and examined claims 1-15.
Office Action from the United States Patent Office mailed Oct. 14, 2025, in related U.S. Appl. No. 18/767,050 and examined claims 1-20.

\* cited by examiner

ROLLING BEARING AND METHOD OF MANUFACTURING SAME

CROSS-REFERENCE

This application claims priority to German patent application no. 10 2023 207 102.9 filed on Jul. 26, 2023, the contents of which are fully incorporated herein by reference.

TECHNOLOGICAL FIELD

The present disclosure is directed to a rolling bearing having an antimony-free composite coating and to a method of manufacturing a rolling bearing having the antimony-free composite coating.

BACKGROUND

Many rotating mechanical apparatuses may include a rolling bearing that enables the relative rotation between a first component and a second component. For example, the first component may be a housing and the second component may be a rotating shaft, wherein an outer ring of the rolling bearing is fitted into the housing and/or an inner ring of the rolling bearing is fitted onto the shaft. Depending on the specific application, it can happen, either due to loads deforming the ring or by design, that one of these fits is a loose fit, which may lead to ring creep.

In some cases, this ring creep may induce a so-called ring creep wear damage. For example, if a steel outer ring is loosely fitted into an aluminum alloy housing, there is a chance that a ring creep of the outer ring induces ring creep wear damage on the aluminum alloy housing due to the relative motion (ring creep movement) between the outer ring and housing. In other words, the outer diameter surface of the outer ring and an inner surface of the housing are rubbed against each other so that wear occurs on the housing. When the wear of the housing increases, a backlash may occur at a rotation support part so that abnormal vibration is generated and the rotating mechanical apparatus is out of order. This may further lead to a loss of alignment which may cause undesired noise. Also, creep wear may cause debris and/or contaminants that may damage the bearing and/or parts of the mechanical apparatus such as gears which may lead to a shorter life of the bearing and/or the mechanical apparatus.

This ring creep movement may be prevented by interlocking or by a rubber O-ring. However, in practice, the interlocking mechanism and rubber O-ring are not a desired solution since it is difficult to realize and/or not reliable. Polymer coating of the rubbing surfaces using solid lubricants and pre-treatment by manganese-phosphating (MnPh) is an alternative solution to reduce the creep wear. So far, the coatings include antimony (Sb), which is regarded a toxic material to human health, and the necessary coating process is very complicated since it requires submerging a complete bearing into an acid liquid bath for the manganese-phosphating process and a thermal curing of the polymer coating.

SUMMARY

It is therefore an aspect of the present disclosure to reduce creep wear damage.

In the following, a rolling bearing is provided which includes at least one outer ring, at least one inner ring, and at least one rolling element arranged between the at least one outer ring and the at least one inner ring. An outer surface of the at least one outer ring is configured to be fitted into a first component, such as a housing, and an inner surface of the inner ring is configured to be fitted to a second component, such as a shaft, wherein the first component and the second component are rotatable relative to one another.

The outer surface of the at least one outer ring may be the radial outer surface of the ring, such as the outer circumference surface of the outer ring. The inner surface of the at least one inner ring may be the radially inner surface of the ring, such as an inner bore of the inner ring. For example, the rolling bearing may be a ball bearing, a cylindrical roller bearing, a tapered roller bearing, and the like. Furthermore, the outer and/or inner ring may be made from a first material. The first material may be steel, particularly bearing steel. The first component and/or second component may be made from a second material that is different from bearing steel. In particular, the second material may be softer than the first material. For example, the second material may be aluminum, an aluminum alloy, or the like. Moreover, the roller bearing may be used in an electric motor, for example in an electric vehicle, or a pump.

In order to reduce creep wear and exposure to toxic materials, at least one of the outer surface of the outer ring and the inner surface of the inner ring is provided with a composite coating comprising at least a binder and a solid lubricant, wherein the coating is free of antimony. Such a composite coating can reduce the wear on element which is fitted to the outer and/or inner ring such that abnormal vibrations and/or noise may be mitigated. Due to the presence of the solid lubricant, the amount of wear on the outer and/or inner ring surface and/or the first and/or second component may be reduced which may also reduce the amount of debris. This may reduce damage of the bearing and/or parts of the mechanical apparatus such as gears which may lead to a longer life of the bearing and/or the mechanical apparatus. Furthermore, due to the lack of antimony in the composite coating any debris and/or contaminates that are produced by the creep wear may be less toxic.

Also, it may be possible to directly apply the composite coating on the metal surfaces of the outer and/or inner ring without the need to provide a bonding layer. This allows the composite coating to be applied to the surface by brushing, spraying, and/or dipping which may reduce manufacturing cost since a complicated application process can be avoided.

The composite coating may have a thickness between 2 to 70 $\mu$m, preferably between 10 to 30 $\mu$m. When the film thickness is smaller than 2 $\mu$m, the composite coating may be worn at an early stage and the creep wear resistance cannot be kept for a long time. Also, it is difficult to uniformly form the bonded film having the thin film thickness less than 2 $\mu$m. On the other hand, when the film thickness exceeds 70 $\mu$m, the strength of the coating may be lowered so that the composite coating may be peeled off. Thus, a coating thickness between 2 and 70 $\mu$m allows for an effective reduction of the creep wear, with a reduced risk that the coating is peeled off.

Preferably, the binder is a polyamide-imide, an epoxy, an acrylic and/or a polybutyl titanate. Moreover, the solid lubricant may be molybdenum disulfide ($MoS_2$), or tungsten disulfide ($WS_2$), magnesium stearate dihydrate, and/or graphene. Such a combination enables a self-lubricating layer that does not include any antimony to be created and can reduce the wear on a housing, particularly on an Al-alloy housing, significantly.

Furthermore, the content of the solid lubricant in the composite coating may be between 2 to 20 wt %, preferably between 5 to 15 wt %. If the content of the solid lubricant in the composite coating is lower than 2 wt %, the effect of the composite coating on creep wear is limited. It may be beneficial in terms of coating strength to limit the content of the solid lubricant in the composite coating to 20 wt % or less. Preferably, the particle size of the solid lubricant is in the range of 0.1-15 µm, preferably 0.5-5 µm. More particularly, the preferred particle size may be defined by the coating thickness and/or the desired coating strength.

According to a further preferred embodiment, the composite coating has a porosity in the range of 2 to 50 vol %, preferably 5 to 25 vol %. Preferably a pore size is in a range of 2 to 50 µm, preferably from 5 to 25 µm. Advantageously, the pores may act as an oil reservoir for lubricant and/or traps for wear debris, which may reduce the abrasive wear on the softer material. Advantageously, the pores may be formed due to an evaporation of solvents that are included in the binder.

Preferably, a surface roughness of the outer surface of the outer ring and/or the inner surface of the inner ring has a surface roughness Ra of 0.5 to 10 µm, preferably 1 to 3 µm, before the composite coating is applied. This allows for an improved bonding of the composite coating on the outer surface of the outer ring and/or the inner surface of the inner ring.

Additionally, the outer surface of the outer ring and/or the inner surface of the inner ring may be provided with a phosphate bond layer before the composite coating is applied, wherein preferably the phosphate bond layer has a thickness of 1 to 7 µm, preferably 2 to 4 µm. This may further improve the bonding of the composite coating on the outer surface of the outer ring and/or the inner surface of the inner ring.

Preferably, a friction coefficient in dry contact against an aluminum alloy is between 0.05 to 0.32. In particular, a lower friction coefficient may indicate a lower amount of creep wear.

According to a further preferred embodiment, the composite coating has a dielectric strength greater than 10 kV/mm and a dielectric constant or relative permittivity of lower than 6.

In case that the rolling bearing is employed in an electric motor, for example in an electric vehicle, it may happen that electric current runs through the bearing and/or that an electric voltage is applied over the rolling bearing. Due to current leakage through the bearing, a lubricant in the bearing and/or the bearing itself, particularly the metal surfaces of the bearing such as the raceways for the rolling elements, may be damaged. The damage may include increase of surface roughness and/or noise and may damage the bearing function. By providing the outer surface of the outer ring and/or the inner surface of the inner ring with a composite coating that may have a dielectric strength greater than 10 kV/mm and a dielectric constant of lower than 6, the electric current passage intensity can be significantly reduced, for example by greater than 80%, and prolong the bearing service life. The relative high dielectric strength and low dielectric constant of the coating can reduce the current intensity and the bearing damage.

According to a further aspect of the disclosure a method for manufacturing a rolling bearing as mentioned above is provided. The method comprises: providing a composite coating comprising a binder and a solid lubricant, wherein the coating is free of antimony, and applying the composite coating on at least one of the outer surface of the outer ring and the inner surface of the inner ring, wherein applying the composite coating may include spraying, brushing and/or dipping the composite coating on the on at least one of the outer surface of the outer ring and the inner surface of the inner ring.

Additionally, the outer surface of the outer ring and/or the inner surface of the inner ring may be provided with a phosphate bond layer before the composite coating is applied, wherein preferably the phosphate bond layer has a thickness of 1 to 7 µm, preferably 2 to 4 µm. Advantageously, adding the phosphate bond layer may improve the bonding of the coating composition the steel component.

Preferably, the method further includes curing the composite coating at a temperature of 150° C. or less, preferably between 22° C. and 130° C. Although a higher curing temperature may provide a higher strength for the composite coating, curing at these lower temperatures has the advantage of saving both energy and costs. In particular, the composite coating may be cured at room temperature. In addition, it may also help to avoid problems that may be caused if a hardened steel component, such as a bearing component, is subjected to temperatures above 150° C. Thus, it may be advantageous to keep the curing temperature below 150° C.

According to a further embodiment, the method further includes, before applying the composite coating, preparing the at least one of the outer surface of the outer ring and the inner surface of the inner ring to have a surface roughness Ra of 0.5 to 10 µm, preferably Ra 1 to 3 µm. This allows for an improved bonding of the composite coating on the outer surface of the outer ring and/or the inner surface of the inner ring.

BRIEF DESCRIPTION OF THE DRAWINGS

In the following, preferred embodiments of the invention are described with reference to the drawings, wherein the drawings are exemplarily only, and are not intended to limit the scope of protection. The scope of protection is defined by the accompanied claims, only.

DETAILED DESCRIPTION

Figure 1:
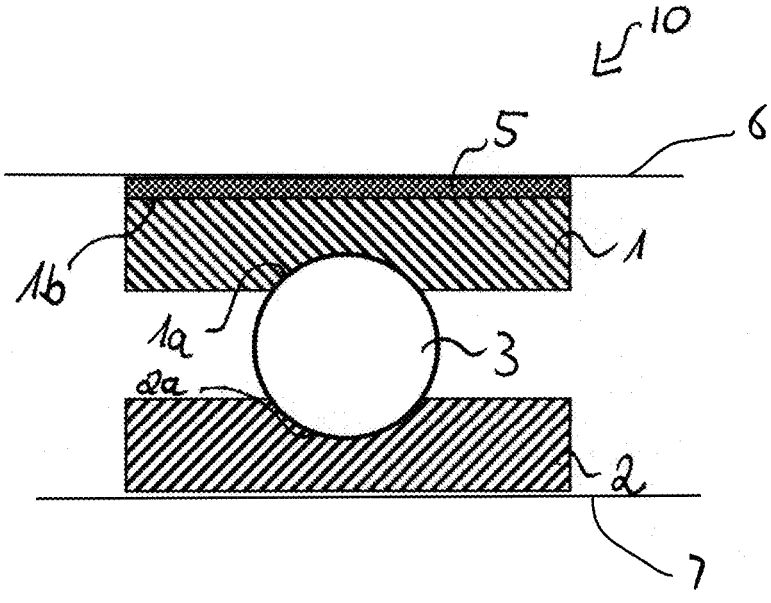
FIG. 1 is a sectional view of a rolling bearing according to an embodiment of the present invention.

In the following same or similar functioning elements are indicated with the same reference numerals.

A ball bearing is shown as an example of a rolling-element bearing in FIG. 1. However, the present disclosure is not limited to any particular type of rolling-element bearing. The ball bearing includes an outer ring 1 having an outer ring raceway 1*a*, an inner ring 2 having an inner ring raceway 2*a*, and a plurality of balls 3 arranged between the inner and outer raceways 1*a*, 2*a*. Also, an outer diameter surface 1*b* of the outer ring 1 of the ball bearing is fitted to a first component 6, such as a housing, and an inner peripheral surface of the inner ring 2 is fitted to a second component 7, such as a shaft.

The outer ring 1 and the inner ring 2 are made of metal, for example bearing steel. Further, the outer diameter surface 1*b* of the outer ring 1 is coated with a composite coating 5 comprising a binder and a solid lubricant. The housing is made of aluminum or aluminum alloy (for example, aluminum die-cast material) for weight reduction, in many cases. Since the composite coating 5 of the present disclosure is softer than aluminum or aluminum alloy (for example, aluminum die-cast material), the housing is not damaged even though the outer diameter surface 1b of the outer ring and the housing may move with respect to each other.

The binder may have high adhesiveness and wear resistance so that the wear of the housing is small, and a creep resistance wear characteristic is improved. For example, polyamide-imide, epoxy, acrylic and/or polybutyl titanate may be used as the binder.

The solid lubricant is required to have lubrication performance and to be softer than a material of the housing, which in the present embodiment is aluminum or aluminum alloy. As the solid lubricant, molybdenum disulfide ($MoS_2$), tungsten disulfide ($WS_2$), magnesium stearate dihydrate, and/or graphene may be used. Molybdenum disulfide may be singly used or may be used together with another solid lubricant, which is softer than the material of the housing, as required. Preferably, a particle size of the solid lubricant is in the range of 0.1-15 μm, preferably 0.5-5 μm.

Moreover, the composite coating 5 has a porosity in the range of 2 to 50 vol %, preferably 5 to 25 vol % with a pore size in a range of 2 to 50 μm, preferably from 5 to 25 μm, wherein the pores may act as an oil reservoir for lubricant and/or traps for wear debris, which may reduce the abrasive wear on the composite coating 5.

In order to form the composite coating 5, the binder is added with predetermined amounts of the solid lubricant so that a coating solution is formulated. Furthermore, a content of the solid lubricant in the composite coating may be between 2 to 20 wt %, preferably between 5 to 15 wt %. Before the coating 5 is applied to the workpiece, a surface of the workpiece is machined to have a surface roughness Ra of 0.5 to 10 μm, preferably 1 to 3 μm. This allows for an improved bonding of the composite coating 5 on the workpiece surface. Then, the coating solution is applied to a workpiece (for example, the outer diameter surface 1b of the outer ring 1) by dipping, spraying, brushing or the like. The composite coating 5 can then be cured at room temperature or at temperature below 150 C, preferably below 130 C.

The film thickness of the composite coating 5 is between 2 to 70 μm. When the film thickness is smaller than 2 μm, the composite coating 5 may wear too quickly, and the creep wear resistance will not last long. Also, it is difficult to uniformly form the bonded film having the thin film thickness less than 2 μm. On the other hand, when the film thickness exceeds 70 μm, the strength of the coating is lowered so that the composite coating 5 may be peeled off. The film thickness is more preferably 10 μm to 30 μm.

Optionally, as a pretreatment for forming the composite coating 5, a phosphate bond layer may be formed before the composite coating 5 is applied. The phosphate bond layer may be formed by a phosphoric acid chemical conversion treatment which can enhance the adhesiveness between the composite coating 5 and the outer diameter surface of the outer ring 1b. As phosphate that is used in the phosphoric acid chemical conversion treatment, manganese phosphate may be exemplified. However, other phosphates such as zinc phosphate, zinc calcium phosphate, iron phosphate and the like may be exemplified as well. A phosphate chemical conversion coating is formed by the phosphoric acid chemical conversion treatment.

Alternatively, when the creep occurs in the inner ring and a shaft, the composite coating 5 may be formed on the inner surface of the inner ring 2.

The present disclosure will now be further described with reference to test examples. However, it should be noted that the present invention is not limited thereto.

In this test, the effects that are to be accomplished by the bonded film of the present invention was verified.

As shown in Table 1, the binder comprising epoxy and the solid lubricant ("$MoS_2$" in Table 1) were combined in the shown amounts so that the coating solution was formulated. Also, the average particle diameter of the raw material of molybdenum disulfide was 0.5 to 3 μm. As the undercoating treatment, a chemical conversion coating of manganese phosphate was formed, and the coating solution was applied to a surface of a test sample made of bearing steel. The coating solution was thermally cured at temperature given in table 1 for 30 minutes to form the composite coating. The thickness of the composite coating is given in Table 1.

For the test, a pin on disk test was performed, wherein a pin is moved with defined load and defined contact pressure over a disk for a predetermined amount of time. This allows to determine the wear depth as well as the average coefficient of friction. Two set were performed for the test, wherein in the first set a steel pin is moved over an aluminum disk and in the second set an aluminum pin is moved over a steel disk. In both sets, the steel component, namely the pin in the first set and the disk in the second set, were provided with a composite coating according to examples 1, 2, 3, or a reference coating containing antimony. Furthermore, uncoated reference samples were prepared as well. The steel pin had a diameter of 82 mm, and the aluminum pin had a diameter of 64 mm. The defined load was 20 N for the steel pin and 10 N for the aluminum pin, wherein the average contact pressure was 130 MPa for the steel pin, and 124 MPa for the aluminum pin. The results for the wear depth on the aluminum as well as the average coefficient of friction are shown in FIGS. 2 and 3.

| Example No. | Solid lubricant type | Curing Temperature (C. °) | Thickness MnPh (μm) | Thickness coating (μm) |
|---|---|---|---|---|
| 1 | MoS2 | 25 | 0 | 20-25 |
| 2 | MoS2 | 25 | 5 | 20 |
| 3 | MoS2 | 130 | 2-5 | 10-15 |
| Ref. | MoS2, Sb2O3 | 130 | 2-5 | 10-15 |
| Uncoated | | | | |

Figure 2:
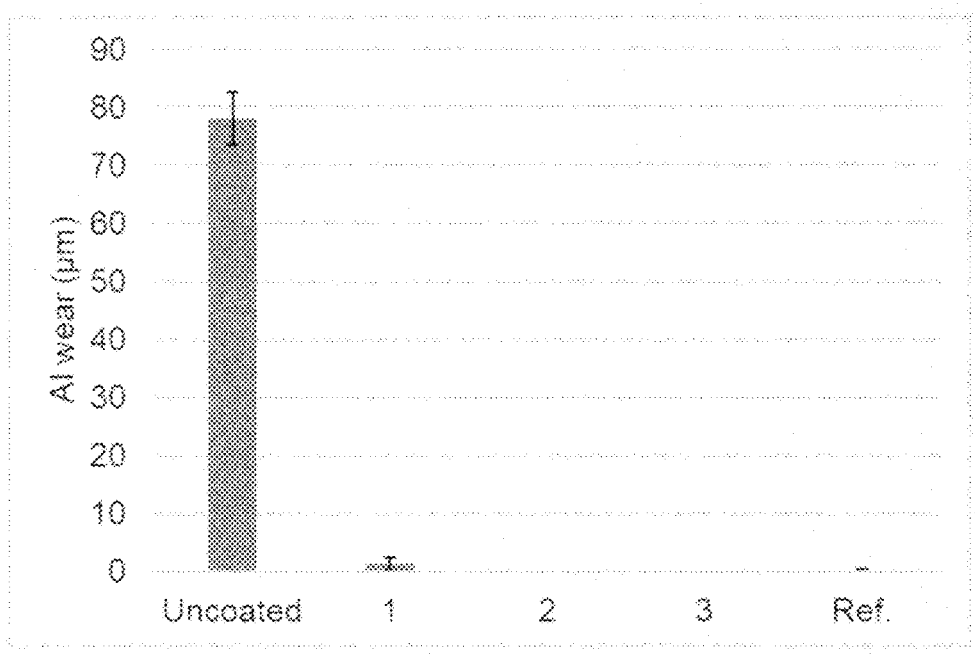
FIG. 2 is a graph obtained in an experiment, depicting a relation between an aluminum wear depth and different composite coatings.
Figure 3:
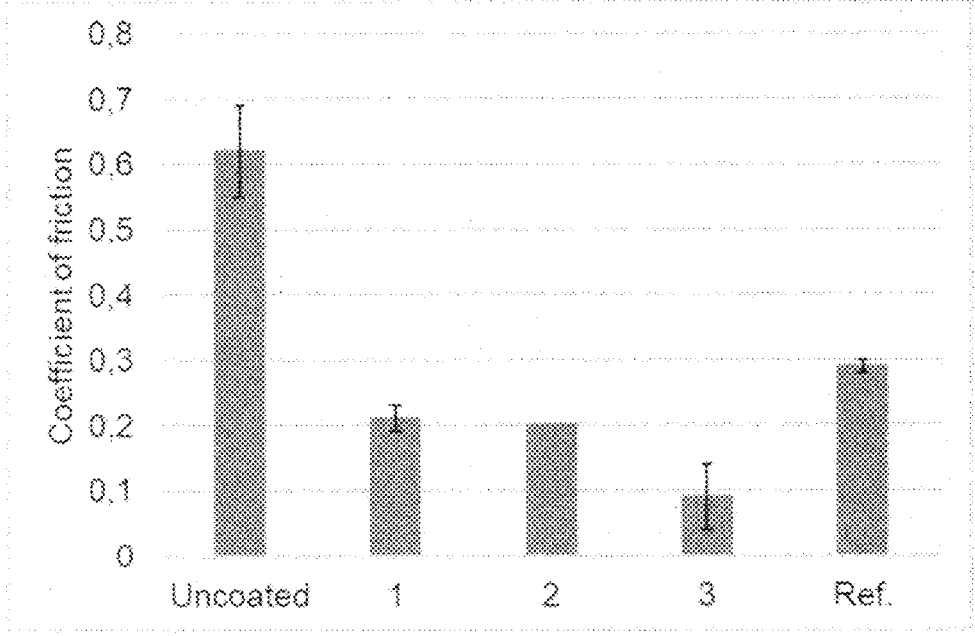
FIG. 3: a graph obtained in an experiment, depicting a relation between an average coefficient of friction and different composite coatings.

It can be seen from FIGS. 2 and 3 that wear on the aluminum can be significantly reduced and that the average coefficient of friction of the Example coatings 1, 2, and 3 is significantly smaller than the reference coating. Even without an undercoating treatment, Example coating 1 is able to reduce the wear depth on the aluminum and shows a significantly smaller coefficient of friction compared to the reference coating. Furthermore, Example coating 1 and 2 show that a curing temperature of 25° C. allows a coating to be formed that can significantly reduce the wear on the aluminum and that has a smaller coefficient of friction than the reference coating.

In summary, the described composite coating can reduce the wear on an element which is fitted to the outer and/or inner ring, such as an aluminum housing, such that abnormal vibrations and/or noise may be mitigated. The described composite coating has a low coefficient of friction which may allow to reduce the number of debris resulting in a longer life of the bearing and/or the mechanical apparatus. Furthermore, due to the lack of antimony in the composite coating any debris and/or contaminates that may be produced by the remaining amount of creep wear may be less toxic.

Also, the composite coating can be directly applied on the metal surfaces of the outer and/or inner ring without the need to provide a bonding layer. This allows the composite coating to be applied to the surface by brushing, spraying, and/or dipping which may reduce manufacturing cost since a complicated application process can be avoided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERALS 1 outer ring
1a outer raceway
1b outer surface
2 inner ring
2a inner raceway
3 rolling element
5 composite coating
6 first component
7 second component

What is claimed is:

1. A rolling bearing comprising:
an outer ring having an outer surface configured to be fitted into a first component,
an inner ring having an inner surface configured to be fitted onto a second component,
at least one rolling element arranged between the outer ring and the inner ring, and
an antimony-free composite coating on the outer surface of the outer ring and/or the inner surface of the inner ring,
wherein:
the antimony-free composite coating comprises a binder and a solid lubricant, and the composite coating has a porosity of 2 to 50 vol % and a pore size of 2 to 50 µm.

2. The rolling bearing according to claim 1, wherein the composite coating has a thickness between 2 to 70 µm.

3. The rolling bearing according to claim 1, wherein the composite coating has a thickness between 10 to 30 µm.

4. The rolling bearing according to claim 1, wherein the binder is a polyamide-imide, an epoxy, an acrylic and/or a polybutyl titanate.

5. The rolling bearing according to claim 1, wherein the solid lubricant is molybdenum disulfide, tungsten disulfide, magnesium stearate dihydrate, and/or graphene.

6. The rolling bearing according to claim 1, wherein the solid lubricant is between 2 to 20 wt % of the composite coating.

7. The rolling bearing according to claim 1, wherein the solid lubricant is between 5 to 15 wt % of the composite coating.

8. The rolling bearing according to claim 1, wherein the solid lubricant is in the form of particles having a size or sizes in the range of 0.1-15 µm.

9. The rolling bearing according to claim 1, wherein the solid lubricant is in the form of particles having a size or sizes in the range of 0.5-5 µm.

10. The rolling bearing according to claim 1, wherein the porosity is 5 to 25 vol % and the pore size is 5 to 25 µm.

11. The rolling bearing according to claim 1, wherein a surface roughness Ra of the outer surface of the outer ring and/or the inner surface of the inner ring is 0.5 to 10 µm before the composite coating is applied.

12. The rolling bearing according to claim 1, wherein a phosphate bond layer having a thickness of 1 to 7 µm is disposed between the outer surface of the outer ring and the composite coating and/or between the inner surface of the inner ring and the composite coating.

13. The rolling bearing according to claim 1, wherein the composite coating has a dielectric strength greater than 10 kV/mm and a dielectric constant of lower than 6.

14. An assembly comprising:
the rolling bearing according to claim 1,
wherein:
the outer ring is fitted into the first component,
the inner ring is mounted on the second component,
the composite coating has a thickness between 10 to 30 µm,
the binder is a polyamide-imide, an epoxy, an acrylic and/or a polybutyl titanate, and
the solid lubricant is molybdenum disulfide, tungsten disulfide, magnesium stearate dihydrate, and/or graphene.

15. The assembly according to claim 14, wherein:
the first component and/or the second component is composed of aluminum or an aluminum alloy, and
a friction coefficient of the composite coating in dry contact against the aluminum or aluminum alloy is between 0.05 to 0.32.

16. The rolling bearing according to claim 14, wherein:
the solid lubricant is between 2 to 20 wt % of the composite coating,
the solid lubricant is in the form of particles having a size or sizes in the range of 0.5-5 µm, and
the composite coating has a porosity of 5 to 25 vol %.

17. The rolling bearing according to claim 16, wherein:
the outer surface of the outer ring and/or the inner surface of the inner ring has a surface roughness Ra of 1 to 3 µm before the composite coating is applied, the first component and/or the second component is composed of aluminum or an aluminum alloy, a friction coefficient of the composite coating in dry contact against the aluminum or aluminum alloy is between 0.05 to 0.32, and the composite coating has a dielectric strength greater than 10 kV/mm and a dielectric constant of lower than 6.

18. A method for manufacturing a rolling bearing according to claim 1, comprising:

providing an outer ring having an outer surface configured to be fitted into a first component, providing an inner ring having an inner surface configured to be fitted onto a second component, providing at least one rolling element arranged between the outer ring and the inner ring, coating the outer surface of the outer ring and/or the inner surface of the inner ring with an antimony-free composite coating comprising a binder and a solid lubricant by spraying, brushing and/or dipping, and curing the composite coating at a temperature less than 150° C. or lower, wherein the solid lubricant is between 2 to 20 wt % of the composite coating.

19. The rolling bearing according to claim 1, wherein:

the binder comprises an epoxy, the solid lubricant comprises molybdenum disulfide particles having an average particle diameter of 0.5-3 μm, the composite coating has a thickness between 10 to 30 μm, and the porosity is 5 to 25 vol %.

20. A rolling bearing comprising:

an outer ring having an outer surface configured to be fitted into a first component, an inner ring having an inner surface configured to be fitted onto a second component, at least one rolling element arranged between the outer ring and the inner ring, and an antimony-free composite coating on the outer surface of the outer ring and/or the inner surface of the inner ring, wherein:

the antimony-free composite coating comprises a binder and a solid lubricant, and the composite coating has a dielectric strength greater than 10 kV/mm and a dielectric constant of lower than 6.

21. A rolling bearing comprising:

an outer ring having an outer surface configured to be fitted into a first component, an inner ring having an inner surface configured to be fitted onto a second component, at least one rolling element arranged between the outer ring and the inner ring, and an antimony-free composite coating on the outer surface of the outer ring and/or the inner surface of the inner ring, wherein:

the antimony-free composite coating comprises a binder and a solid lubricant, and the solid lubricant is between 2 to 20 wt % of the composite coating.

* * * * *